United States Patent
Ward et al.

(10) Patent No.: US 7,146,337 B1
(45) Date of Patent: Dec. 5, 2006

(54) SYSTEM AND METHOD FOR ORIGINATING LOANS

(75) Inventors: Perry S. Ward, San Rafael, CA (US); Frank R. Scavone, San Francisco, CA (US); Joseph B. Heil, Orinda, CA (US)

(73) Assignee: Precept Corporation, San Francisco, CA (US)

( * ) Notice: Subject to any disclaimer, the term of this patent is extended or adjusted under 35 U.S.C. 154(b) by 656 days.

(21) Appl. No.: 09/661,271

(22) Filed: Sep. 13, 2000

(51) Int. Cl.
*G06Q 40/00* (2006.01)

(52) U.S. Cl. .......................... 705/38; 705/35; 705/37; 705/26

(58) Field of Classification Search ............... 705/38, 705/37, 35, 26; 709/229
See application file for complete search history.

(56) References Cited

U.S. PATENT DOCUMENTS

| | | | |
|---|---|---|---|
| 4,953,085 A | 8/1990 | Atkins | 364/408 |
| 5,611,052 A | 3/1997 | Kykstra et al. | 395/238 |
| 5,644,726 A | 7/1997 | Oppenheimer | 395/238 |
| 5,664,115 A | 9/1997 | Fraser | 705/37 |
| 5,797,133 A | 8/1998 | Jones et al. | 705/37 |
| 5,924,082 A | 7/1999 | Silverman et al. | 705/37 |
| 5,930,776 A | 7/1999 | Dykstra et al. | 705/38 |
| 5,940,812 A | 8/1999 | Tengel et al. | 705/38 |
| 5,946,668 A | 8/1999 | George | 705/38 |
| 5,966,699 A | 10/1999 | Zandi | 705/38 |
| 5,983,206 A | 11/1999 | Oppenheimer | 705/38 |
| 5,995,947 A | 11/1999 | Fraser et al. | 705/38 |
| 6,016,482 A | 1/2000 | Molinari et al. | 705/35 |
| 6,233,566 B1 * | 5/2001 | Levine et al. | 705/37 |
| 6,385,594 B1 * | 5/2002 | Lebda et al. | 705/38 |
| 6,871,140 B1 * | 3/2005 | Florance et al. | 701/207 |
| 6,898,636 B1 * | 5/2005 | Adams et al. | 709/229 |
| 2001/0005829 A1 | 6/2001 | Raveis | |
| 2001/0027436 A1 | 10/2001 | Tenenbaum | |
| 2001/0029482 A1 | 10/2001 | Tealdi et al. | |
| 2002/0023049 A1 * | 2/2002 | Peterson | 705/37 |
| 2002/0029188 A1 * | 3/2002 | Schmid | 705/38 |

FOREIGN PATENT DOCUMENTS

WO    WO 9913425 A1 *   3/1999
WO    WO 0208855 A3 *   1/2002

OTHER PUBLICATIONS

Schneider, Howard: "Revving up Online", Mortgage Banking, Washington, Mar. 1999, v59, i6, p26(7).*
Glen, Gwendolyn: "Real Estate Finance Today", Washington, May 3, 1999, v16, i17, p10(1).*
Strickberger, Matt: "Lenders fear Freddie Mac pilot will give brokers 'portability'", National Mortgage News, New York, Jul. 19, 1999, v23, i44, p39(1).*

(Continued)

*Primary Examiner*—Yogesh C. Garg
(74) *Attorney, Agent, or Firm*—Morgan, Lewis & Bockius LLP

(57) ABSTRACT

The present invention is directed to a method of originating a loan. The method includes the steps of receiving loan request information from an applicant, developing underwriting information relating to the loan, and storing the loan request and the underwriting information so that it is accessible to a plurality of prospective lenders. The method further includes the steps of receiving at least one bid from at least one of the prospective lenders and storing the bid so that the applicant has an opportunity to consider and accept the bid. A corresponding software application and a system are also discussed.

71 Claims, 19 Drawing Sheets

OTHER PUBLICATIONS

"Ex-Nomura execs plan mortage web site", Commercial Alert, Newark, Apr. 17, 2000, p1(2).*

From Dialog Classic Web (TM) File 9, Commerical Mortgage Lending Goes Online, Bank Technology News, v 13, n6, p. 48, Jun. 2000, see p. 1+.

From Dialog Classic Web (TM) File 20, LoanApp.com Signs Up More Than 150 Mortgage Companies, Business Wire, Oct. 25, 1999, see p. 1+.

From Dialog Classic Web (TM) File 20, Bank One's Finance One Group Joins the Lending Tree Network, Business Wire, Nov. 19, 1998, see p. 1+.

ORR, Easy Money (The Future of Online Lending), ABA Banking Journal, 92, 3, 41, Mar. 2000 (from Dialog Classic Web (TM) File 148.

Strickberger, Commercial Mortgage Lending Goes Online, p. 48-49+, Jun. 2000 (From Dialog Classic Web (TM) File 268).

Baldo, New Age Lenders of Grave Dancers? Treasury & Risk Management, v 9, n1, p. 13-14, Jan. 1999, see p. 1-3 (From Dialog Classic Web (TM) File 13).

Steel, 'Detecting' The Highest Bid (Mortgage Lenders Can Use Software Products to Determine Which Bid to Accept for their Loan Packages), Mortgage Technology, v 5, n3, p. 48-54, May 1998 (from Dialog Classic Web (TM) File 13).

Ervolini, Trends in Commercial Mortgage Loan Pricing, Commercial Lending Review v 16, n1, p. 40-42, Winter 2000/2001, see pp. 1-3, (from Dialog Classic Web (TM) File 15).

Lamalfa, Wholesale Giants, Mortgage Banking, v 52, n3, pp. 10-21, Dec. 1991 (from Dialog Classic Web (TM) File 15).

* cited by examiner

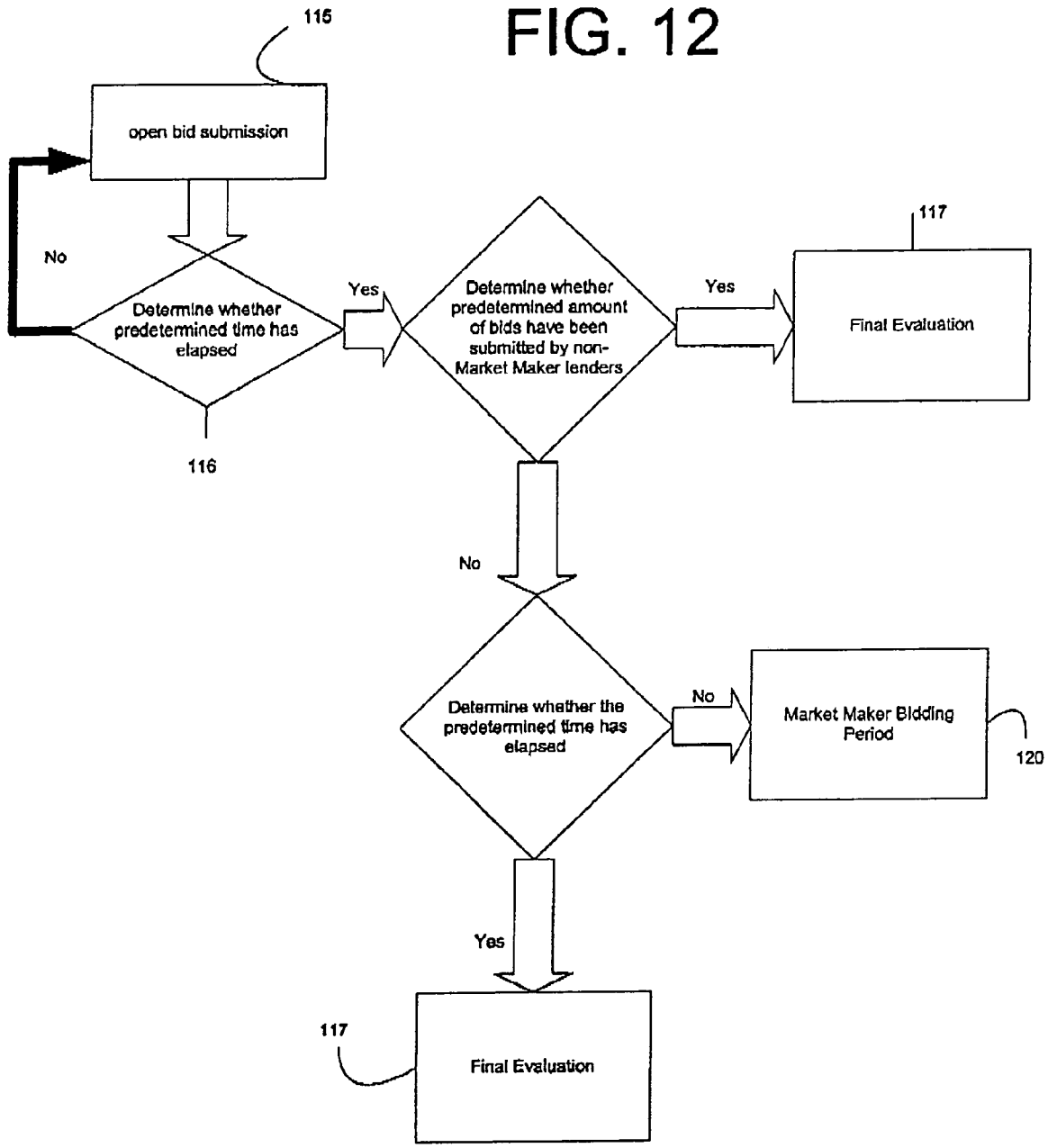

Bid Editor

View Bid | Commitment Ltr | Activate Bid | Delete | Save | Values from Template | Exit-no Save | Copy | Copy to Template Templates

Bid Identification and Status

| | | | |
|---|---|---|---|
| Bid Name | Frank | | |
| Bid ID | 186 | | |
| Bid Submission Date* | Enter a Date | or | 06/01/2000  6 AM  0 |
| Bid Expiration Date* | Enter a Date | or | 08/01/2000  6 AM  0 |

[*Enter dates in 'mm/dd/yyy' format]

| | |
|---|---|
| Created on Date | 7/24/2000 9:54AM |
| Last Modification Date | 8/21/2000 10:15AM |
| Bid Status | Inactive |
| Activated On | 7/19/00 9:17AM |
| Cancelled On | 1/1/02 0:00AM |
| Expired On | 8/1/00 6:00AM |
| Accepted On | 1/1/02 0:00AM |
| Lender Name | |
| Financing Name | The New Bates Hotel |
| Financing ID | 58 (Click to view) |
| Auction ID | 51 (Click to view) |
| Applicant | Hp.Lee.Smokes |
| Mortgage Broker | null.null |

Top

Commitment Information

| | Borrower Request | Lender Bid |
|---|---|---|
| Terms of Commitment (days) (1) | | 35 |
| Third Party Report Waivers | | |
|    Appraisal Waived | | ☐ |
|    Environmental Report Waived | | ☑ |
|    Engineering Report Waived | | ☐ |
| Loan Committee Approval Required | | ☑ |
| Additional Conditions to Closing | | ☑ |
| Market Conditions | | ☑ |
| Survey/Zoning Waivers | | |

FIG. 13(a)

Survey Waived ☐

Zoning Waived ☐

Top

Rate Type - All Loans

| | Borrower Request | Lender Bid |
|---|---|---|
| Rate Type (3) | [Fixed] | Fixed for Term ▼ |

Top

Fixed Rate Loans or Fixed Rate Loans Converting to Floating Rate Loans

| | Borrower Request | Lender Bid |
|---|---|---|
| Initial Fixed Rate Term (mos) (4) | | 0 |
| Fixed Rate Pricing Index (5) | | USTFeb10 |
| Fixed Rate Spread (%) (6) | | 3.75 |
| Pre-Closing Adjustment to Fixed Rate Spread | | ☑ |
| Minimum Fixed Interest Rate (%) | | 7.5 |

Top

Floating Rate Loans or Floating Portion of Fixed Rate Loans Converting to Floating Rate Loans

| | Borrower Request | Lender Bid |
|---|---|---|
| Floating Rate Pricing Index | NA | NA ▼ |
| Floating Rate Spread (%) | | 0 |

]

Adjustable Floating Rate Spread Schedule*

[

[*Only complete the schedule below if your loan has periodic spread adjustments]

| Ending Month of Term | | Floating Rate Spread | |
|---|---|---|---|
| 0 | mos | 0 | % |
| 0 | mos | 0 | % |
| 0 | mos | 0 | % |

| | Borrower Request | Lender Bid |
|---|---|---|
| Pre-Closing Adjustment to Floating Rate Spread | | ☐ |
| Rate Reset Period (mos) | | 0 |
| Rate Floor (%) | | 0 |
| Rate Cap (%) | | 0 |
| Maximum Periodic Rate Change (%) | | 0 |
| Third Party Rate Cap Required | | ☐ |

[* If checked, fill out 2 fields below]

FIG. 13(b)

| | Borrower Request | Lender Bid |
|---|---|---|
| Cap Level (%) | | 0 |
| Cap Agreement Term (mos) | | 0 |

Top

All Loans - Other Payment Parameters

| | Borrower Request | Lender Bid |
|---|---|---|
| Lender Provided Early Rate Lock | | ☐ |
| Payment Day of Month (1-28) | | 3 |
| Interest Calculation Basis | | 30/360 |
| Grace Period for Monetary Default (days) | | 0 |
| Hyperamortization* | | ☑ |
| | [* If checked, fill out 2 fields below] | |
| Hyperamortization Interest Rate Step Up (%) | | 5 |
| Term to Optional Prepayment Date (mos) | | 120 |
| Term (mos) | 120 ([MIN][MAX] | 300 |
| Interest-Only Period (mos) | | 0 |
| Amortization Term (mos) | [AMTERM][MIN #] | 300 |

Top

Prepayment or Defeasance Terms

| | Borrower Request | Lender Bid |
|---|---|---|
| Prepayment or Defeasance Provisions (not withstanding any Lockout Period) | | Defeasance (No Partial) |
| Defeasance Lockout Period (mos) | | 24 |
| Amount of Flat Fee (%) | | 0 |
| Prepayment Lockout Period (mos) | | 0 |
| Limited Prepayment Right (mos) | | 0 |

[* Note: If Prepayment other than Defeasance is permitted, fill out the applicable fields in the remainder of this section]

| | | |
|---|---|---|
| Minimum Prepayment Amount | | 0 |
| Property Release with Partial Prepayment (multi-property transactions only) ($) | | ☐ |
| Required Prepayment for Property Release (multi-property transactions only) ($) | | 0 |

]

Prepayment/Exit Fee Schedule*

[
[* Applies if "Penalty Schedule" is selected. If selected, up to 6 fee periods can be entered]

| Extension Period | Interest Rate Step-up |
|---|---|
| 66 mos | 6 % |

FIG. 13(c)

| | |
|---|---|
| 6 mos | 6 % |
| 6 mos | 6 % |
| 6 mos | 6 % |
| 6 mos | 6 % |
| 6 mos | 6 % |
| 0 mos | 0 % |
| 0 mos | 0 % |
| 0 mos | 0 % |

| | Borrower Request | Lender Bid |
|---|---|---|
| Prepayment Premium Upon Default (%) | | 0 |

Top

Extension Options

Borrower Requests Extension Options    [ ]

]
Lender's Extension Option Schedule*

[

\* Do not provide for extension options if you have checked 'Hyperamortization' (under 'All Loans - Other Payment Parameters').

| Extension Period | Interest Rate Step-up | Fee |
|---|---|---|
| 0 mos | 0 % | 0 % |
| 0 mos | 0 % | 0 % |
| 0 mos | 0 % | 0 % |

| | Borrower Request | Lender Bid |
|---|---|---|
| Debt Service Coverate Ratio Test for Extension (:1) | | 0 |
| Hard Lockbox During Extension Period | | ☐ |

Top

Loan Structure Provisions

| | Borrower Request | Lender Bid |
|---|---|---|
| Loan is Assumable* (37) | | ☑ |
| Cap on Number of Assumptions (37A) | | 2 |
| | | [* If checked, fill out two fields below] |
| Assumption Fee (%) (38) | | 1 |
| Recourse (39) | NA | Non Recourse ☑ |
| Environmental Guarantor (40) | | ☑ |
| Single Purpose Entity (41) | | Require Borrower SPE ☑ |
| Non-Consolidation Opinion (42) | Will Consider | ☑ |

Principal Schedule*

FIG. 13(d)

|  | Principal Name |
|---|---|
| Name of Principal 1 | |
| Name of Principal 2 | |
| Name of Principal 3 | |

|  | Borrower Request | Lender Bid |
|---|---|---|
| Independent Director | Will Consider | ☐ |
| Lockbox | Spring* | Spring w/DSCR Trigger |
| [* If 'Springing w/ DSCR Trigger' chosen, complete field below] | | |
| Springing Lockbox DSCR Trigger (:1) | | 1.2 |
| Management Kickout* | Yes | ☑ |
| [* If 'Yes with DSCR Trigger' chosen, complete field below] | | |
| Management Kickout DSCR Trigger (:1) | | 1.15 |
| Earthquake Insurance Required | | ☑ |
| Additional Debt Permitted | | ☐ |
| [* If 'Permit Additional Debt', complete the appropriate fields below] | | |
| Additional Debt DSCR, LTV and $Amount Cap Restrictions: | | |
| Additional Debt DSCR Constraint (:1) | | 0 |
| Additional Debt LTV Constraint (%) | | 0 |
| Additional Debt Dollar Amount Constraint ($) | | 0 |
| Security for Additional Debt | | Unsecured Debt |
| Transfers of Equity Owners' Interest | | Freely Transferable |

Top

Upfront and Ongoing Reserves

|  | Borrower Request | Lender Bid |
|---|---|---|
| Tax Payment Escrow | | ☑ |
| Ground Lease Payment Escrow | | ☑ |
| Insurance Payment Escrow | | ☑ |
| Up-front Engineering Holdback (%) | | 50000 |
| Up-front Environmental Holdback (%) | | 25000 |
| Ongoing Capital Expenditure (non-hotels) or FF&E (hotels) Escrow | | ☑ |
| [* If checked, complete the following fields:] | | |
| Annual CAPX or FF&E Reserve Dollar Amount* ($) | | 2500 |
| Cap on CAPX or FF&E Escrow Account Balance* ($) | | 100000 |
| [* Use Sum of CAPX and/or FF&E for multi-property] | | |
| Engineer's Override of Lender's CAPX or FF&E | | ☑ |
| Debt Service Reserve (mos) | | 0 |
| Seasonality Reserve Escrow | | ☐ |
| Rollover Reserve Escrow | | Not Required |
| Up-front Rollover Reserve ($) | | 0 |

FIG. 13(e)

Rollover Escrow Cap ($)     0

]

Rollover Reserve Schedule*

[     (* Measured in months from first payment)

|  | Ending Month |  | Monthly Reserve Requirement |
|---|---|---|---|
| Rollover Reserve Period 1 | 0 mos | $ | 0 |
| Rollover Reserve Period 2 | 0 mos | $ | 0 |
| Rollover Reserve Period 3 | 0 mos | $ | 0 |

|  | Borrower Request | Lender Bid |
|---|---|---|
| Pre-Funding of Reserve Amount (mos) |  | 0 |

Additional Reserves     ☑

Top

Fees

|  | Borrower Request | Lender Bid |
|---|---|---|
| Commitment Fees to Lender from Borrower (%) (68) |  |  |
| Processing Fee ($) (68A) |  | 15000 |
| Refundable Percentage of Commitment Fee (%) (69) |  |  |
| Origination Fee to Lender from Borrower (%) (70) |  | 1 |
| Exit Fee (%) (70A) |  | 1 |

Top

Lender's Loan Sizing Parameters

|  | Borrower Request | Lender Bid |
|---|---|---|
| Projected Loan Amount ($) (71) |  | 1250000 |
| Maximum Loan to Value Test (LTV) (%) (72) |  | 75.25 |
| Maximum Loan to Cost Test (%) (72A) |  | 80 |
| Minimum Debt Service Coverage Ratio Test (DSCR)* (:1) (73) |  | 1.255 |

[* If you enter a Min DSCR, you have the option to enter a Minimum Loan Sizing Constant (below)]

| Minimum Sizing Constant (%) (74) |  | 10.485 |
|---|---|---|
| Reliance on Precept's or Rating Agencies Indication of Net Cash Flow (75) |  | Precept Leases in Place ☑ |
| Lender's Underwritten Net Cash Flow* ($) (76) |  | 0 |

[*If you have not indicated a "Reliance on Precept's net cash flow", you have the option to enter your underwritten net cash flow calculated at the time of bidding.]

Top

Lender's Specific Additional Provisions

Input any specific commitment provisions to be appended to the Commitment letter as Appendix A

FIG. 13(f)

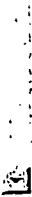
Top
Precept's Estimated Interest Rate and Proceeds 
Estimated Full Term Nominal Rate (%)  [##.##]
Estimated Full Term Effective Rate (%)  [##.##]
   Estimated Initial Fixed Rate Term Nominal Rate* (%) [##.##] %
   Estimated Initial Fixed Rate Term Effective Rate* (%) [##.##]
[*Fixed Rate Converting to Floating Rate Only]
Top
:Update:  :Delete:
FIG. 13(g)

SYSTEM AND METHOD FOR ORIGINATING LOANS

FIELD OF THE INVENTION

The present invention is directed to a system and method for facilitating the origination of loans. In particular, the present invention provides a system and method for processing loan requests, such as requests for commercial mortgages.

BACKGROUND OF THE INVENTION

Origination processes for commercial mortgage loans are usually a costly and time-consuming undertaking. As opposed to the origination of loans for residential property, the loan origination process for commercial property involves significantly more complex work in evaluating the risks of a potential lending opportunity. Also, unlike residential real estate due diligence activities, until recently there has been little industry-wide consensus as to an accepted standard or protocol, which causes unnecessary inefficiency.

For residential loans, a loan authorizer (who may be an employee of the lender) approves the loan based upon standards which, generally speaking, are used consistently in the residential mortgage market. For instance, a prospective borrower provides the lender with information regarding the amount of the loan desired and certain preliminary financial information about the borrower (e.g., gross household income, length of current employment, etc.). The amount of due diligence usually involves inspecting and appraising the property to be mortgaged and performing a credit check on the borrower. A loan is granted to the prospective borrower if the bank determines, in accordance with the above-described procedure, that the borrower is qualified.

The origination process for commercial mortgage loans is materially different from the loan process discussed above. Usually an extensive amount of information regarding the property and principals involved in the financing is gathered, synthesized and verified, making the underwriting process time-consuming and expensive. For example, cash flow underwriting based on historical income statements, rent rolls, revenue and expense source documents (e.g., bank statements, tax returns, utility bills, management and service agreements and leases) may be required to be collected and analyzed. In addition, appraisal, engineering, environmental and/or crime reports on the property may also be required to be gathered and examined. Because the breadth, depth and scope of the due diligence exercised for any given property can vary and because the lack of an industry standard has resulted in variations with respect to work scopes, methodologies and report formats, it is difficult to share the expense of underwriting with other lenders.

To compound the above discussed inefficiencies, few loan inquiries lead to a loan origination making the origination process for commercial mortgage loans costly. Prospective borrowers commonly shop around to various lenders for the best loans and therefore submit applications to numerous different lenders. Expensive staff at each lender have to review every new loan application. Since only one lender can fund a loan with the prospective borrower, most loan inquiries do not lead to a successful origination of a loan and the lending institution is burdened with fruitless due diligence expenses. At the same time, borrowers are typically dissatisfied with the multiple application process because repetitive information is asked. Further, in some instances, lenders ask an up-front fee to cover their underwriting expenses. As a result, both borrowers and lenders alike suffer from the redundant, high cost efforts.

Online services have been developed to streamline the loan origination process and reduce costs. Presently, online services generally replicate the conventional manner of brokering loans in the form of loan referral systems. For example, an intermediary may represent the borrower in a similar manner as an offline broker and may form a traditional broker package to refer to appropriate lenders and advise the borrower during closing. In another known service model, an intermediary collects information online from the borrower, sorts the information and provides the borrower with standard term sheets from lenders that have pre-specified a desire for loans that match the borrower's submission. Once the borrower commits to a lender, the intermediary works directly for the lender as a due diligence consultant. If the lender contacts the borrower, the borrower is on his own to negotiate a commitment with the lender.

The majority of online systems currently established provide insufficient quality of underwriting and lack control over the information submitted by borrowers. As a result, initial lender pricing, proceeds and terms have a high degree of volatility between initial contact with a borrower and the closing of a loan. Most online systems require the borrower to first scan potential lenders and their very generic pricing and terms, before deciding which lender the borrower wishes to send his loan application. Negotiations are then conducted between the borrower and lender electronically. A system is needed which will allow firmer commitments of pricing of loans for borrowers up-front, as well as a higher degree of assurance that the loan closes.

Online auctions are known in the field of loan origination. One such system is described in U.S. Pat. No. 5,966,699 issued to Zandi. A method and system are taught for conducting an auction over a computer network in which lenders submit bids on previously approved loan applications.

It is desired that a service be provided to present a lender participating in an auction with more information regarding a loan request, so that the lender can better evaluate the risk of lending prior to bidding. A system that offers competitive pricing and terms among many lenders is also desired. It is also desired that such a system be conducted by using a computer network or networks, such as the Internet, which is accessible to a number of prospective borrowers, as well as a number of prospective lenders.

A system is needed to lower origination costs and standardize the origination process. It is further desired that an independent provider of underwriting perform a greater amount of due diligence before a lender is involved in the loan origination process. It is also desired that a service be provided that combines an auction with comprehensive underwriting. Efficiency is also desired in a streamlined underwriting, pricing and closing process.

SUMMARY OF THE INVENTION

The present invention is directed to a method and system for originating loans. The method includes the steps of developing underwriting information relating to a potential loan, providing lenders with access to at least part of the underwriting information, providing lenders an opportunity to bid on the loan in an auction, and providing the borrower or his representative an opportunity to consider the bid(s).

Preferably, these steps are performed on a computer system such as a server connected to the Internet or other communication network.

In a preferred embodiment the loan is a commercial mortgage and a request for the loan may specify financing requirements.

Preferably the underwriting includes a plurality of underwriting levels and, more preferably, at least three underwriting levels. In a preferred embodiment, the underwriting information comprises net cash flow information, property site inspection information and credit information. The underwriting information can further comprise information from at least one report selected from the group of an appraisal report, environmental report and engineering report. In a further embodiment the information received in support of the potential loan is tracked electronically, preferably via an online information system.

The preferred method can also include allowing the borrower or his representative to select at least one lender to which information about the loan is inaccessible. In another embodiment, the method includes allowing the borrower or his representative to select at least one lender to be notified of the request for the loan.

In a preferred embodiment, the auction comprises a review phase and a bidding phase and no bidding is allowed during the review phase.

In a further embodiment, prior to receiving a bid, the method includes allowing at least one inquiry relating to the loan request and underwriting information to be submitted and stored so as to be accessible to the prospective lenders, the borrower and/or his representative. The method further includes allowing at least one inquiry response to be submitted and made accessible to the prospective lenders, the borrower and/or his representative. In a further embodiment, during a bidding period, the method includes allowing at least one inquiry relating to a bid to be submitted and stored so as to be accessible to the prospective lenders and the borrower. The method further includes allowing at least one inquiry response to be submitted and made accessible to the prospective lenders and borrower.

In another embodiment the bidding phase comprises a plurality of bidding periods. In one embodiment, at least one of the bidding periods is a sealed bidding period wherein all bids received from a prospective lender are stored and are not accessible to other prospective lenders. The method can also include a sealed bid evaluation period wherein submitting or canceling bids is not allowed. The method can also include an open bidding period and the step of allowing at least one of the lenders to submit bids to be stored and accessible to the prospective lenders. The method can also include an open bid evaluation period wherein submitting or canceling bids is not allowed. In a further embodiment, the open bidding period is followed by a "market maker" bidding period wherein one or more lenders is obligated to bid. In a further embodiment, the bid contains more than one loan term parameter. In another embodiment, the method includes the step of generating a document for binding the borrower and the lender if the borrower accepts a bid. In a further embodiment, after a bid is accepted the closing of the loan is facilitated.

Another embodiment is directed to a software program implemented in a server computer system. Another embodiment is directed to a computer system for practicing the invention.

BRIEF DESCRIPTION OF THE DRAWINGS

Preferred features of the present invention are disclosed in the accompanying drawings, wherein similar reference characters denote similar elements throughout the several views, and wherein:

FIG. 12 is a flow chart of another bidding step of an auction step of FIG. 3; and FIGS. 13*a–g* depict an example of a bid submission form document.

DETAILED DESCRIPTION OF THE INVENTION

Figure 1:
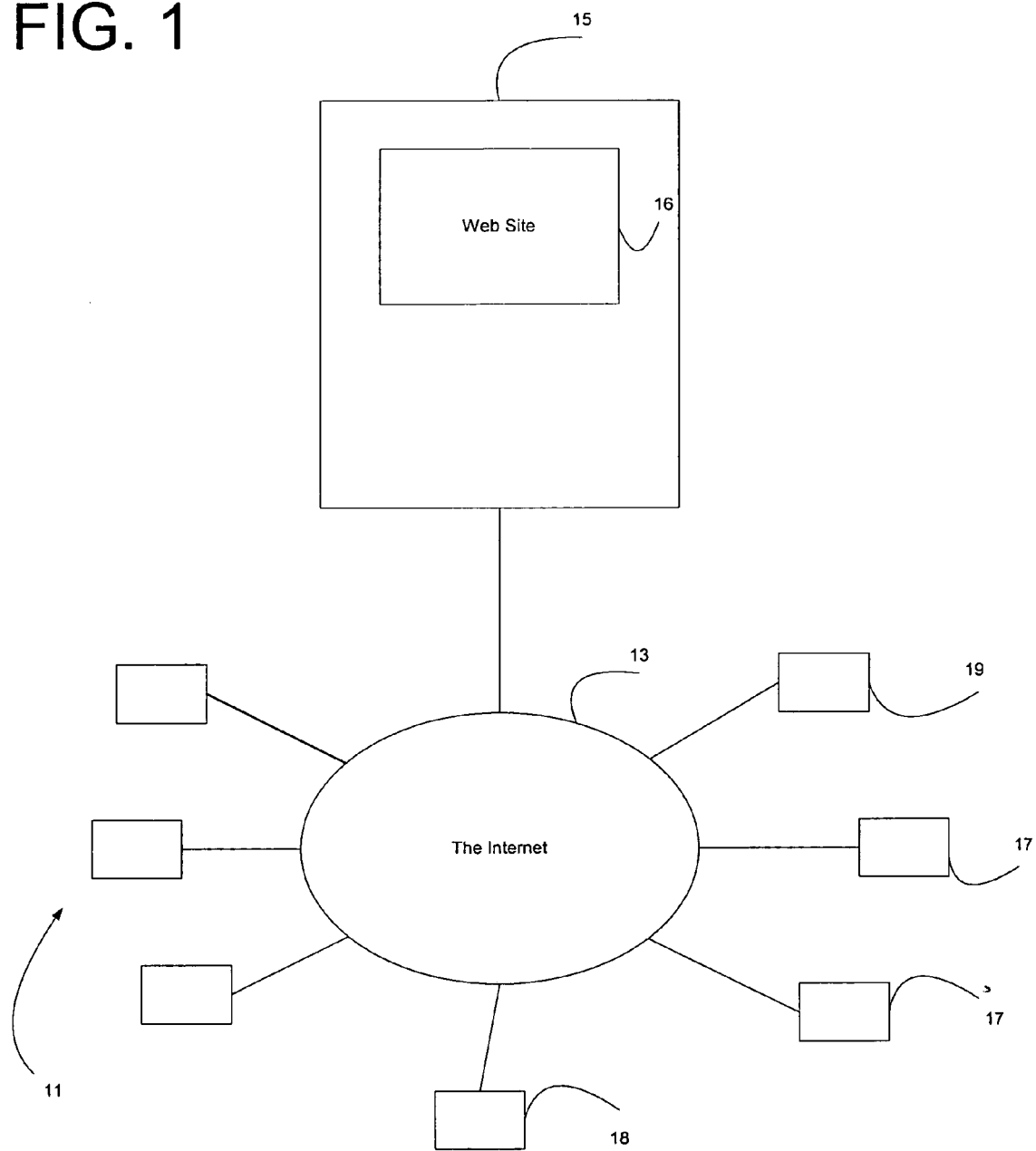
FIG. 1 is a block diagram of various components of the present invention.

Referring to FIG. 1, the loan origination system of the present invention preferably includes a number of client computers 11 connected to a server 15 via the Internet 13. The number of client computers 11 preferably includes a prospective borrower computer 17, a loan underwriter computer 18, and a plurality of lender computers 19. Server 15 is configured to support a Web site 16 through which a system representative, underwriters, prospective borrowers and prospective lenders interact. Typically, the system representative is associated with the entity that runs the auction on server 15. Preferably, client computers 11 are connected to server 15 and Web site 16 via Internet 13. In an alternative embodiment, client computers 11 are connected to server 15 via local area network (LAN) or wide area network (WAN) which may also be connected to the Internet 13. Various other ways to connect client computers 11 to server 15 are also available in the art.

Client computers 11 are preferably personal computers (PC). In alternative embodiments, client computers 11 are Unix workstations. In yet another embodiment, client computers 11 are not required to include a microprocessor, as long as client computers 11 are capable of sending and receiving Web browser messages over the Internet with server 15 or capable of communicating over a LAN or WAN. The specific type of processor and operating system used by client computers 11 are not important to the present invention. Client computers 11 may be operated using Windows®, Linux, Unix, a Web based operating system or other operating systems available in the art.

As noted above, client computers 11 are preferably linked to server 15 via the Internet. More specifically, client computers 11 and server 15 are connected through an Internet Service Providers (ISP). Client computers 11 and server 15 preferably communicate with each other using a common communication protocol, such as Hypertext Markup Language (HTML), Java, JavaScript, Extended Markup Language (XML) or other similar communication protocol available in the art.

Figure 2:
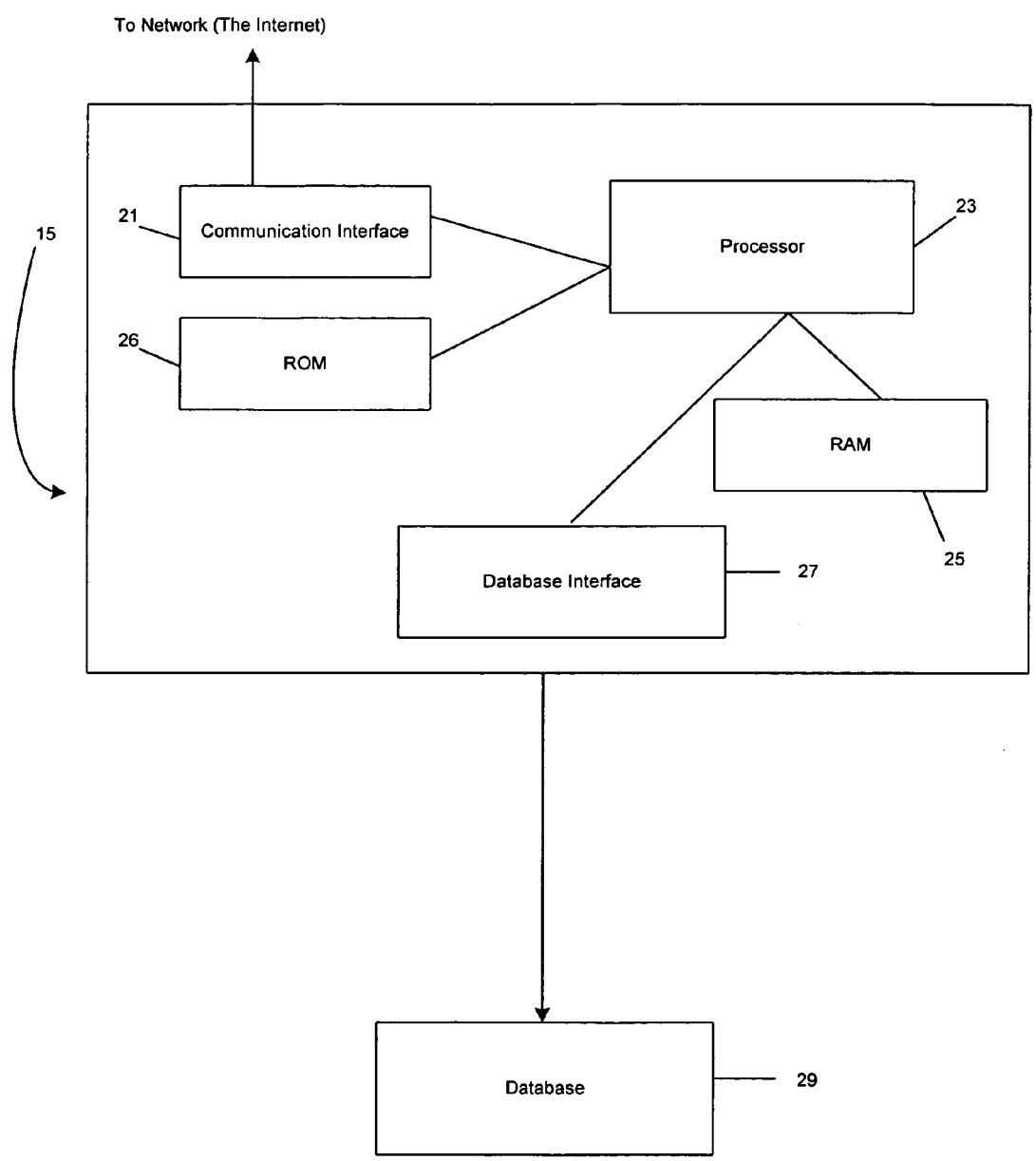
FIG. 2 is a block diagram of various components of a server computer of the present invention.

Referring to FIG. 2, server 15 includes a communication interface 21, one or more processors 23 (e.g., one or more microprocessors), random access memory (RAM) 25, read only memory (ROM) 26, a database interface 27 and other conventional components of an Internet Web server as known in the art.

While a single processor is illustrated in FIG. 2, server 15 may include one or more Unix workstations, PC's, or a number of computers connected together for parallel processing or a supercomputer. In the present embodiment of the invention, the functions of communication interface 21 are provided by an interface server that controls three processors 23 each of which is connected to RAM 25, ROM 26 and database interface 27. In other embodiments, server 15 may also include computers having similar processing power capacity to client computer 11.

Communication interface 21 is preferably configured to transmit and receive electronic messages from remote locations (i.e., client computers 11) via the Internet 13 using a common communication protocol such as TCP/IP and/or a common Web browser.

ROM 25 preferably stores a number of software applications which are to be downloaded to processor 23 and executed therein. The software applications include operating systems, device drivers and other software applications as known in the art. Moreover, the software applications further include computer executable instructions necessary to run Web page generation and storage and other software applications necessary to provide numerous features of the present invention as discussed herein.

As noted above, server 15 is configured to support Web site 16. In this regard, server 15 manages the communications protocols and houses Web pages and software required to support Web site 16. The software resides on the server and serves Web pages to the client computers 11. Web site 16 preferably includes a secure portion that is password protected so that sensitive information may be stored in the secure portion.

Server 15 is coupled via database interface 27 to at least one database 29 that is used to hold the datatables needed in the practice of the invention. Database 29 is preferably implemented in the form of a single database using conventional database management systems such as the SQL server supplied by Microsoft or other similar products. Database interface 27 is configured to generate appropriate search commands to store and retrieve relevant data from database 29 based on commands from processor 33. In an alternative embodiment, processor 33 may interface directly with database 29.

Using the above described hardware/software configuration, the present invention provides a system and method for processing financing requests and facilitating financing agreements. This system is especially suited for facilitating the origination of commercial mortgages. Moreover, the present invention is equally applicable to numerous other financing arrangements and is not limited to commercial mortgages.

Figure 3:
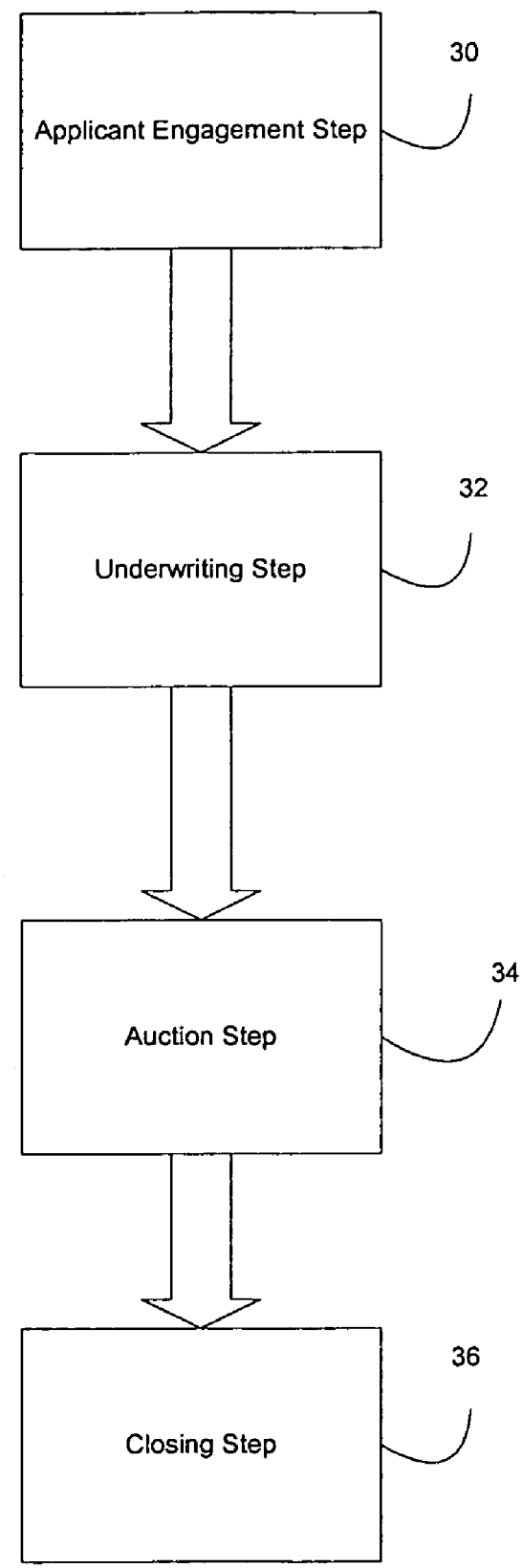
FIG. 3 is a flow chart showing an overview of the present invention.

Referring to FIG. 3, an overview of the method according to the present invention is shown. Broadly, the method of the present invention includes an applicant engagement step 30, an underwriting step 32, an auction step 34, and a closing step 36. First, at applicant engagement step 30, an applicant provides contact information relating to itself and its proposed loan. It should be noted that an applicant is meant to include a prospective borrower or any representative or agent thereof, such as a broker. Preferably, the applicant submits the information from a client computer and it is received at the server computer. Then the applicant selects a level of underwriting to be performed and enters into an agreement for underwriting, auction and loan closing services.

Next, at underwriting step 32, underwriting information is developed pertaining to the financing request. Underwriting information is meant to include any information useful in assessing the risk of lending to the borrower or the risk of lending on an asset and may include a plurality of parameters or data points. A lender is meant to include a bank, finance company, mortgage bank, or any other entity in the business of providing funds for loans. The underwriting information is obtained by performing due diligence, such as by gathering, assembling and synthesizing information about the property and principals involved. Inevitably, some of the information is supplied by the prospective borrower and some may be developed independently by the underwriter. Preferably, the information is summarized into a report and preferably, at least a portion of the underwriting information is posted on Web site 16 prior to proceeding to auction step 34. Ordinarily, representations and warranties are provided to prospective lenders that specific procedures were followed in performance of the underwriting.

Next, at auction step 34, the prospective lenders are provided an opportunity to submit a bid or a plurality of bids at an auction for the financing request. Preferably the auction is conducted during a plurality of periods and the lender may choose during which period to bid. The lender may bid multiple times and in multiple periods and the lender is allowed to submit bids in a structured format to the borrower. For example, the lender preferably submits bids in a multi-parameter bid form having a question/answer format so that the lender can select among a group of options (e.g., 4 options from drop down menus) to fill out the form. The borrower can partially select/choose the structure of the bid by articulating some of the parameters which are most important to his/her financing needs. Ultimately, the borrower interprets and selects which bid is preferable. Evaluation periods are provided which hold bids active for a predetermined time so that the borrower has an opportunity to evaluate the submitted bids. Preferably, the auction is conducted on Web site 16.

If the applicant accepts a bid, the closing step 36 is entered to close the transaction. A commitment letter incorporating the terms as reflected in the accepted bid form is automatically generated for the applicant and lender to execute, and additional underwriting is performed. Advantageously, the commitment letter is generated by server 15.

Figure 4:
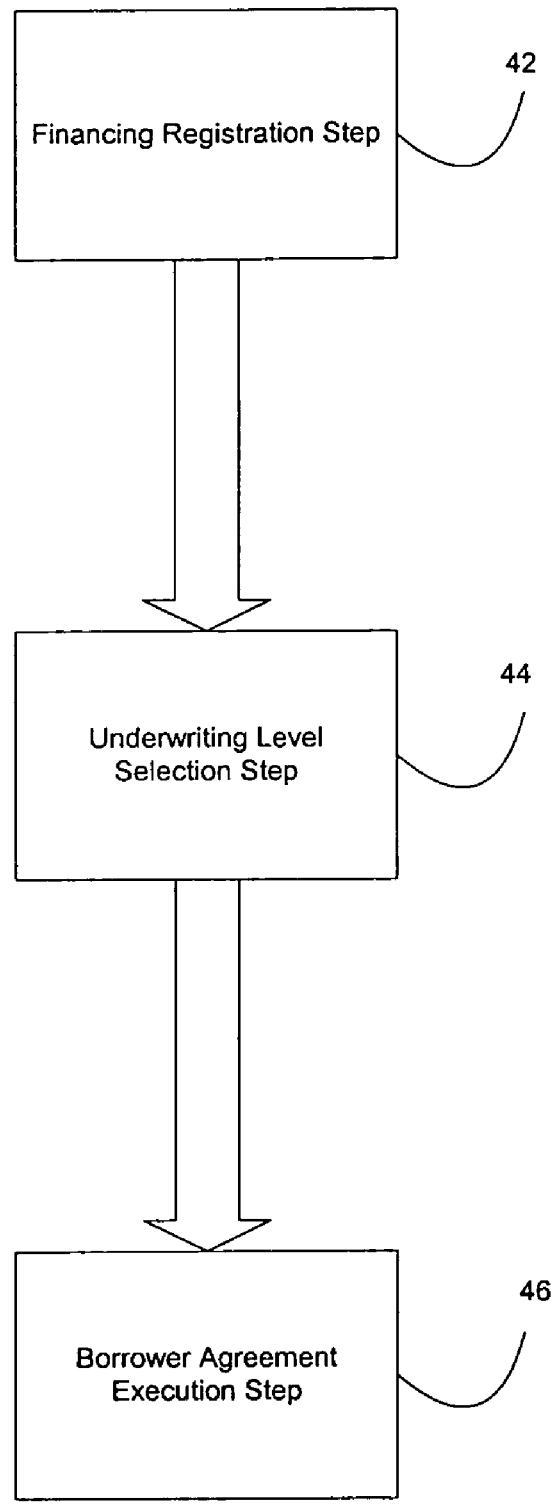
FIG. 4 is a flow chart showing an overview of an applicant engagement step of FIG. 3.
Figure 5:
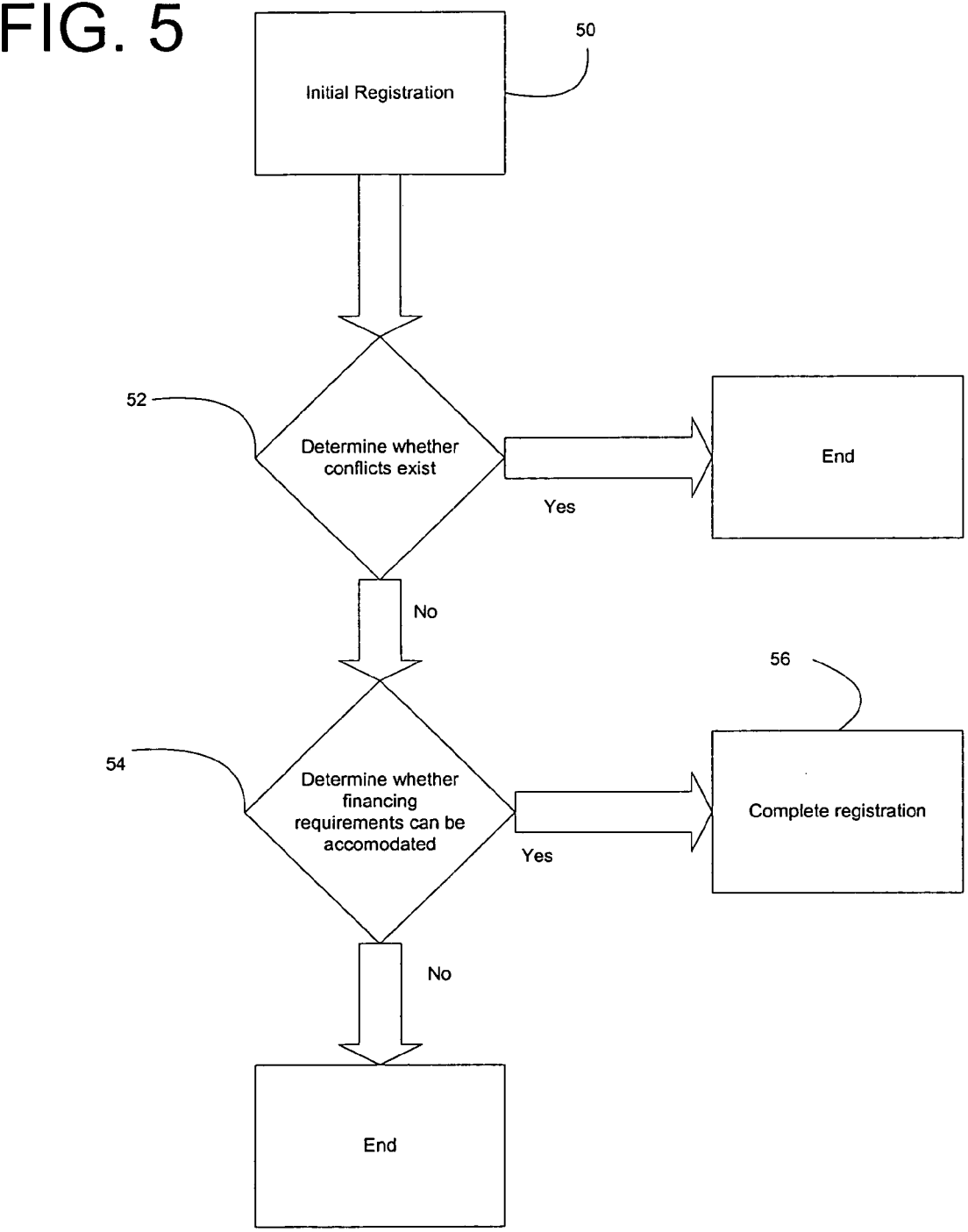
FIG. 5 is a flow chart of a financing registration step of an application engagement step of FIG. 3.

Referring now to FIG. 4, an overview of applicant engagement step 30 is shown. Applicant engagement step 30 includes a financing registration step 42, an underwriting level selection step 44, and a borrower agreement execution step 46. FIG. 5 shows the financing registration step 42 in more detail. First at 50, the applicant submits initial information to server 15 via the Internet 13 or by contacting a system representative by telephone. For instance, before an applicant requests financing, he/she may first visit Web site 16 on server 15. Web site 16 and/or the system representative inform the applicant of any issues, concerns, referrals or questions that may arise during the financing process and provide information that may assist the applicant in seeking financing. If the applicant is interested in proceeding further, a form on Web site 16 may be filled out to communicate initial registration information (e.g., name, property type and financing requirements) via the Internet 13. The submission of such information through the Web site preferably provides sufficient contact information to allow the system representative to telephone the applicant and discuss the financing process, if needed. Alternatively, the same form can also be provided by the system representative.

Once the applicant submits initial registration information, the information is stored in database 29. In a preferred embodiment, the information is registered in database 29 automatically as the applicant fills out and submits the form Web page. Alternatively, the information may be entered manually by the system representative. In this way, as the applicant proceeds with attempting to obtain a loan, the financing transaction can be monitored. For tracking purposes, the initial registration information is placed in database 29 and applicant is given an "applicant engagement" status.

Next at 52, it is determined whether conflicts exist. Specifically, a screening is performed which uses the initial registration information to perform a search in database 29 to determine if any issues exist with the applicant, property or financing that would bar entering into an agreement with the applicant. For instance, a search is performed to determine whether a financing has been registered previously regarding the applicable property. In a preferred embodiment the final determination is made by the system representative.

Next at 54, a determination is made whether the applicant's financing requirements can be accommodated. If it is believed that the applicant's financing requirements cannot be accommodated, a financing transaction is not pursued with the applicant. In a preferred embodiment, the final determination is made by the system representative who informs the applicant of such a determination and terminates discussions.

Next at 56, if it is determined that the applicant's financing requirements can be accommodated, the applicant provides additional information. The additional information is then entered into database 29 to complete the financing registration step 42. A general summary of the applicant's desired financing and the contact date are also preferably stored in database 29. Advantageously, this information is submitted by the applicant from a client computer to the server computer by completing a form on Web site 16.

It should be noted that, throughout the financing process, the applicant may visit Web pages at Web site 16 or confer with the system representative regarding the financing process. For instance, a summary of the financing process (including the underwriting, auction and closing of a financing) as well as an explanation of various fees, deposits, expenses, and time frames involved is available to the applicant. Also, the system representative or Web site 16 preferably may inform the applicant of an understanding of the current market lending conditions and may provide indications of market pricing and terms for similar financings based on market conditions for other similar borrowers. Such a service is facilitated by obtaining information from lenders, market makers, financing transaction histories and from other sources.

Referring again to FIG. 4, underwriting level selection step 44 follows financing registration step 42. During this step, the applicant may wish to consult with an underwriter to obtain answers to questions and other assistance in completing the borrower agreement. For instance, the underwriter may encourage the applicant to authorize higher levels of underwriting (specifically, ordering of Third Party Reports (as defined below)) in order to increase the certainty of closing a loan contract on favorable terms and accelerating the financing process. Advantageously, the underwriter is associated with the entity that runs the auction.

Figure 6:
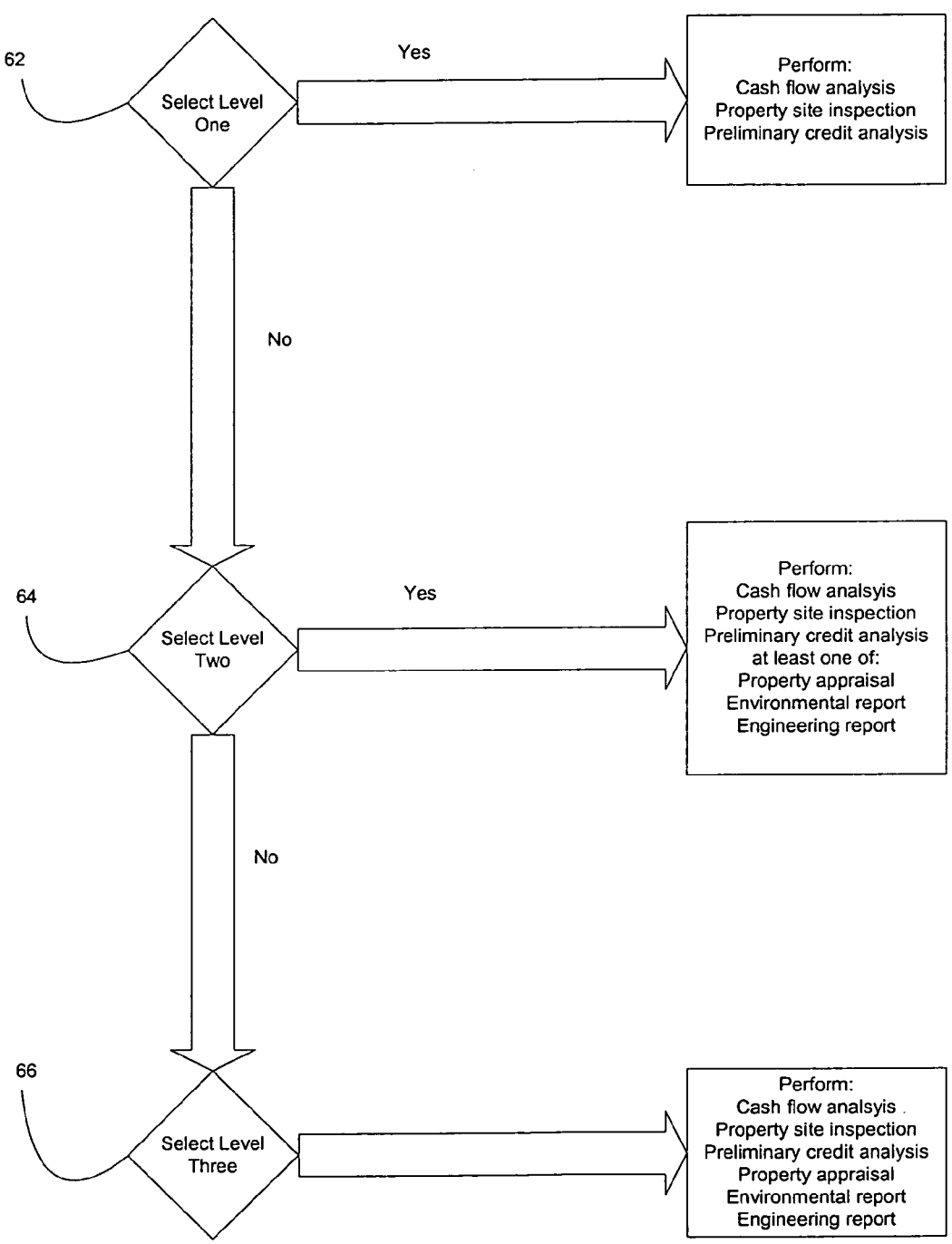
FIG. 6 is a flow chart of an underwriting level selection step of an application engagement step of FIG. 3.

Referring to FIG. 6, an overview of the underwriting level selection step 44 is shown. In the preferred embodiment, an underwriting process includes three levels (underwriting level one, underwriting level two, and underwriting level three) from which the applicant may choose. If the applicant selects underwriting level one at step 62, a minimum level of due diligence is performed. Illustratively, underwriting level one includes a net cash flow analysis that is performed based on property level historical operating data (e.g., historical income statements and rental revenue) and the reconciliation of such data to (i) source documents (e.g., bank statements, tax returns, utility bills, management and service agreements and leases), (ii) market information (e.g., primary and secondary market research and property photos), and (iii) relevant industry operating ratios. In underwriting level one, a property site inspection and preliminary credit analysis are performed, and the results of the completed net cash flow analysis preferably are reviewed by a national statistical rating agency (e.g., Standard & Poor's, Moody's and Fitch). This net cash flow analysis is then subject only to due diligence performed after auction step 34 and is reconfirmed upon completion of such. However, a property appraisal, environmental or engineering report (also known as "Third Party Reports") is not ordered and not reviewed prior to commencing auction step 34. Underwriting level one assumes that the Third Party Reports will be ordered during closing step 36 and that the underwriting information will be adjusted accordingly at that point.

If the applicant does not select underwriting level one, the applicant considers underwriting level two at step 64. Underwriting level two includes the same site inspection and net cash flow analysis as in underwriting level one. In addition, the applicant preferably selects one or two Third Party Reports to be performed prior to auction step 34, and the underwriting is adjusted to reflect the results of the completed Third Party Reports. As in underwriting level one, the results of the completed net cash flow analysis preferably are reviewed by a national statistical rating agency (e.g. Standard & Poor's, Moody's and Fitch). The selected Third Party Reports are commissioned and prepared prior to beginning auction step 34. Underwriting level two assumes that the Third Party Reports that are not selected by the applicant will be ordered during closing step 34 and that the underwriting information will be adjusted accordingly at that point.

If the applicant does not select underwriting level one or underwriting level two, underwriting level three is provided. Underwriting level three includes the site inspection and net cash flow analysis performed in underwriting level one as well as the results of all Third Party Reports. As in underwriting level one, the results of the completed net cash flow analysis preferably are reviewed by a national statistical rating agency (e.g. Standard & Poor's, Moody's and Fitch).

Referring again to FIG. 4, after the financing registration step 42 and underwriting level selection step 44 are complete, borrower agreement execution step 46 is entered. In this step a borrower agreement is executed that registers a commitment to seek underwriting and sets out general ground rules for the financing transaction, including rules for the auction step and underwriting step. The applicant may select particular lenders to be invited to participate in the auction and/or particular lenders to be excluded from the auction. The applicant may access Web site 16 to review the auction rules and/or download a borrower agreement for review. After the applicant completes the borrower agreement, applicant engagement step 30 is complete.

Figure 7:
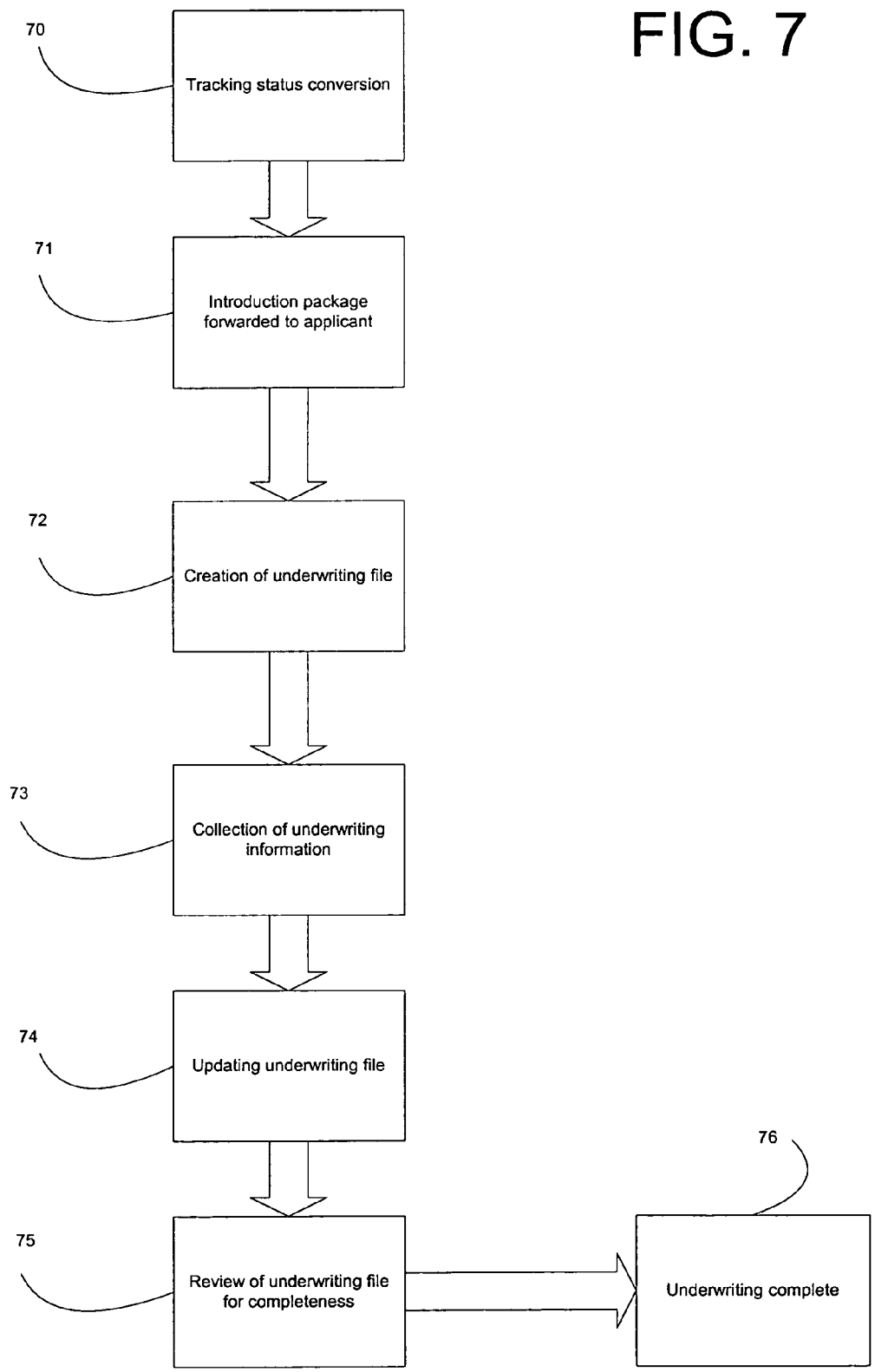
FIG. 7 is a flow chart of an underwriting step of FIG. 3.

Referring back to FIG. 3, once applicant engagement step 30 is complete, underwriting step 32 begins. FIG. 7 shows an overview of underwriting step 32. First, at step 70, the status of the applicant's financing is converted from "applicant engagement" to "underwriting" and a record of such conversion is entered into database 29. Also, some of the applicant's financing registration information, and other underwriting information such as commencement date and anticipated completion date of underwriting step 32 are entered into a pipeline table in database 29 (which also may list the property type, city, state, requested amount of the loan, and the interest type). Preferably, all lenders have access to the pipeline table in database 29, however, a subset of the lenders may be prevented from accessing database 29.

Next, at step 71, an introduction package including a pre-auction checklist is forwarded to the applicant. The pre-auction checklist includes the preliminary items that the applicant is to submit before beginning auction step 34 and all other items that the applicant is to submit during underwriting step 32. The applicant may submit hard copies of the necessary completed forms or complete an electronic version of such forms, for example, on a floppy disc. Alternatively, it is expected that applicants will soon be able to complete the form on Web site 16 via Internet 12. The pre-auction checklist can be amended to conform to the applicant's specific financing request. In addition, at the time the introduction package is sent, the applicant is also sent an access password to a secure portion of Web site 16.

At this juncture, an underwriter and a closing coordinator may assist in the loan underwriting. Typically, the underwriter and the closing coordinator are associated with the entity that conducts the auction. For instance, at step 72, the closing coordinator creates a loan underwriting file to store underwriting information corresponding to the applicant's financing request in database 29. Preferably, the underwriting and closing checklist items, including pre-auction checklist items, are maintained in the underwriting file. The underwriter may contact the applicant to discuss the underwriting of the applicant's financing, explain the underwriting process, answer questions concerning the process and the specific items on the pre-auction checklist.

Next, the collection of the underwriting information begins at step 73. Throughout underwriting step 32, the closing coordinator and underwriter receive and review all pre-auction checklist items collected from the applicant and independent sources. The closing coordinator coordinates the site inspection of the property. Also, the closing coordinator orders any Third Party Reports authorized by the borrower agreement, and causes an on-line database search to be conducted to determine if there are any obvious credit problems related to the applicant or any of its principals. Physical record searches are preferably conducted during the closing step 36 (FIG. 3). The underwriter preferably monitors the closing coordinator and the collection of any required information and documentation. Once all applicable fees and certain preliminary underwriting items are received, the underwriter causes the actual underwriting to commence.

Next, the applicant's underwriting file is updated at step 74 to reflect the underwriting information as it is collected. In a preferred embodiment, an underwriting and closing checklist Web page is also updated.

At step 75, the underwriting file is reviewed for completeness. The underwriter oversees the completion of the underwriting step in accordance with the underwriting level selected by the applicant and otherwise in accordance with the pre-determined, standardized underwriting practices and records any deviations therefrom. The underwriter preferably also coordinates the review of any pre-auction net cash flow analysis by the rating agency and reviews final pre-auction underwriting information with the applicant. After the underwriting information has been reviewed with the applicant, the underwriting step 32 is complete.

Figure 8:
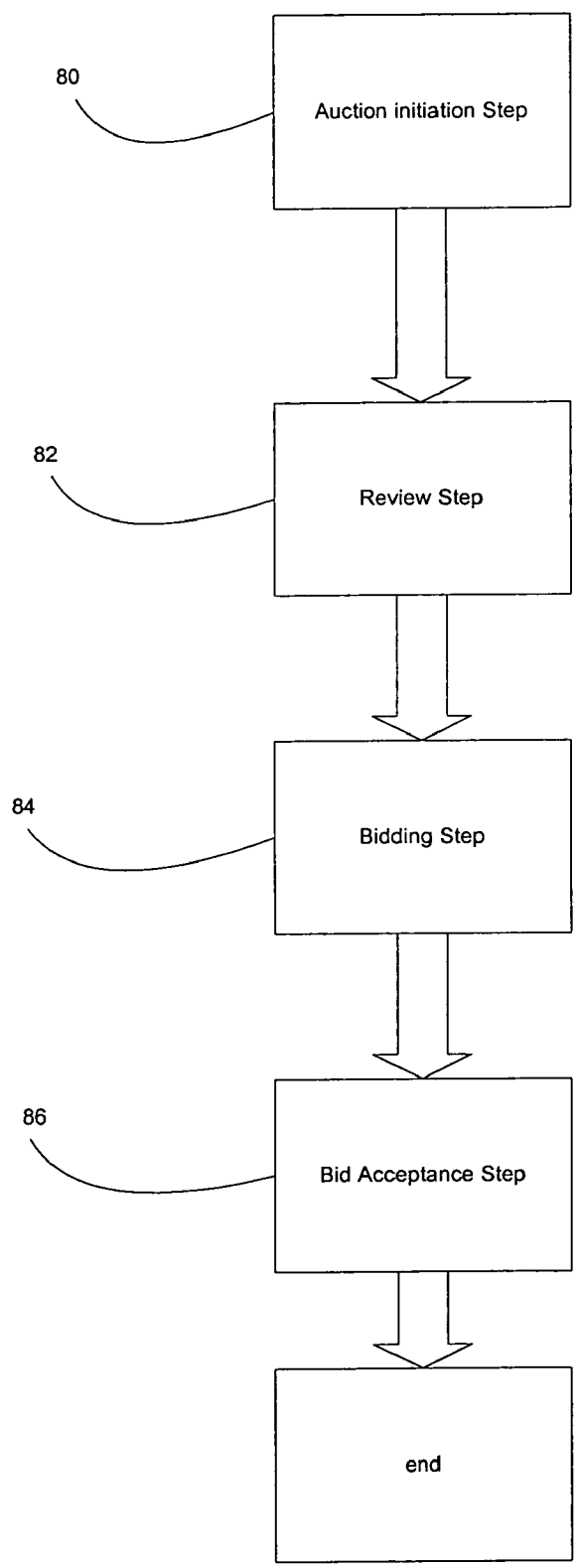
FIG. 8 is a flow chart showing an overview of an auction step of FIG. 3.

Referring again to FIG. 3, after completion of underwriting step 32, auction step 34 begins. FIG. 8 shows an overview of auction step 34. Auction step 34 includes an auction initiation step 80, a review step 82, a bidding step 84, and a bid acceptance step 86.

Figure 9:
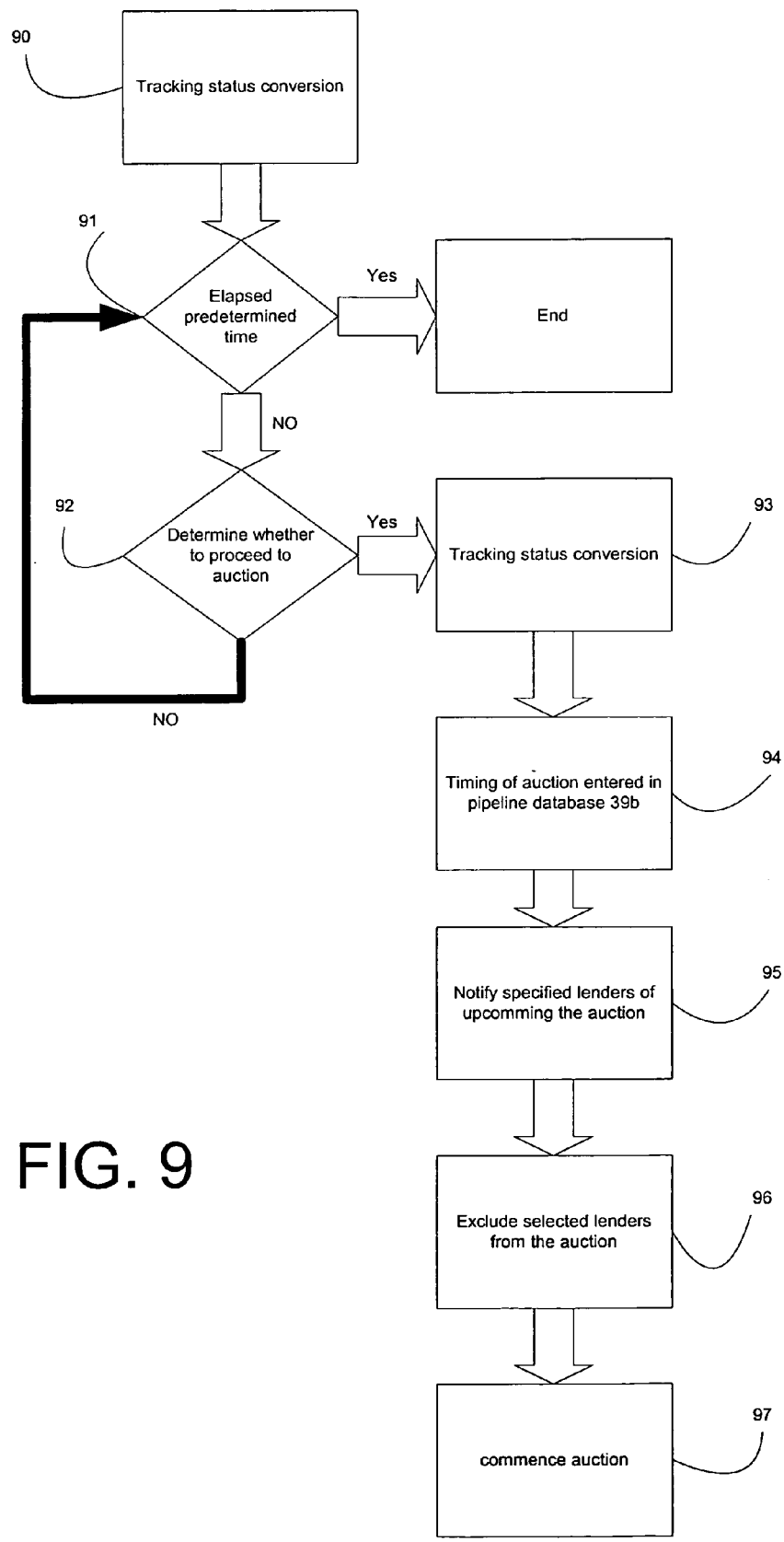
FIG. 9 is a flow chart of an auction initiation step of an auction step of FIG. 3.

Referring to FIG. 9, an overview of auction initiation step 80 is shown. First, at step 90, the underwriter notes the completion of the underwriting by converting the status of the applicant's financing from "underwriting" to a "post confirmation" status in database 29. From the date of such conversion, the applicant preferably has a predetermined time, such as seven (7) days, to proceed with auction step 34.

During this predetermined time, the applicant determines at step 92 whether to proceed to auction. The applicant likely considers the underwriting information and relative market conditions based on available information, such as prior financing transactions recently completed. Also the underwriter and/or a system representative may assist the applicant by discussing the underwriting information and auction process.

If the applicant chooses to proceed to auction, an auction request form is executed by the applicant and at step 93, the system representative converts the tracking status of the financing from "post confirmation" to "auction notice" in database 29. At the same time, applicant provides certain parameters of a loan it is willing to accept (the "Financing Request").

Next, at step 94, the timing of the different periods of the auction are entered into the pipeline table in database 29.

The entire bidding step generally takes place over a predetermined period of time, for example, over eight business days. However, the auction immediately terminates if the applicant accepts a bid. The lenders submit bids corresponding to the applicants' Financing Request to the Web site 16 via a bid submission form (discussed further below). Preferably all bids are stored in database 29 and are accessible to the applicant. Each bid may also be accessible to lenders depending upon auction rules, as described further below. Bids remain active during auction bidding step 84 unless canceled in accordance with auction rules or if the bid specifically sets forth a cancellation date and time. The applicant is permitted to submit questions to underwriting personnel and the lenders via Web site 16 concerning any bids throughout the bidding step. The questions of the applicant and the answers from underwriting personnel and the lenders are posted on Web site 16 and accessible for review by the applicant and all lenders.

Lenders specified by the applicant are notified at step 95 about the upcoming auction via e-mail or other means of communication and/or a message posted on Web site 16 as well as through updates to the pipeline table in database 29. Also, the notification may include some of the applicant's Financing Request information and may include some of the underwriting information. For instance, the applicant may select these lenders as a result of the applicant's past or present relationship with the specified lenders. This message to such specified lenders also preferably informs the lenders of the identity of the applicant and that the applicant would like the lenders to give special consideration to the applicant's financing.

As indicated by step 96, certain lenders may be prevented from accessing the applicant's information on Web site 16 and from participating in the auction of the applicant's financing. This is done if the applicant indicates in the borrower agreement which lenders shall be excluded from participating in the auction of the Financing Request.

The auction of applicant's financing begins at step 97. The applicant's Financing Request information (e.g., property type and amount of desired loan) is stored in database 29. Also, applicant's Financing Request information, a summary of the underwriting information and some of the underwriting information (e.g., applicant provided property operating statements and rent revenues and applicable third party reports) are posted on the Web site 16 for review by all lenders except those lenders that the applicant specifically excluded from participating in the auction.

Figure 10:
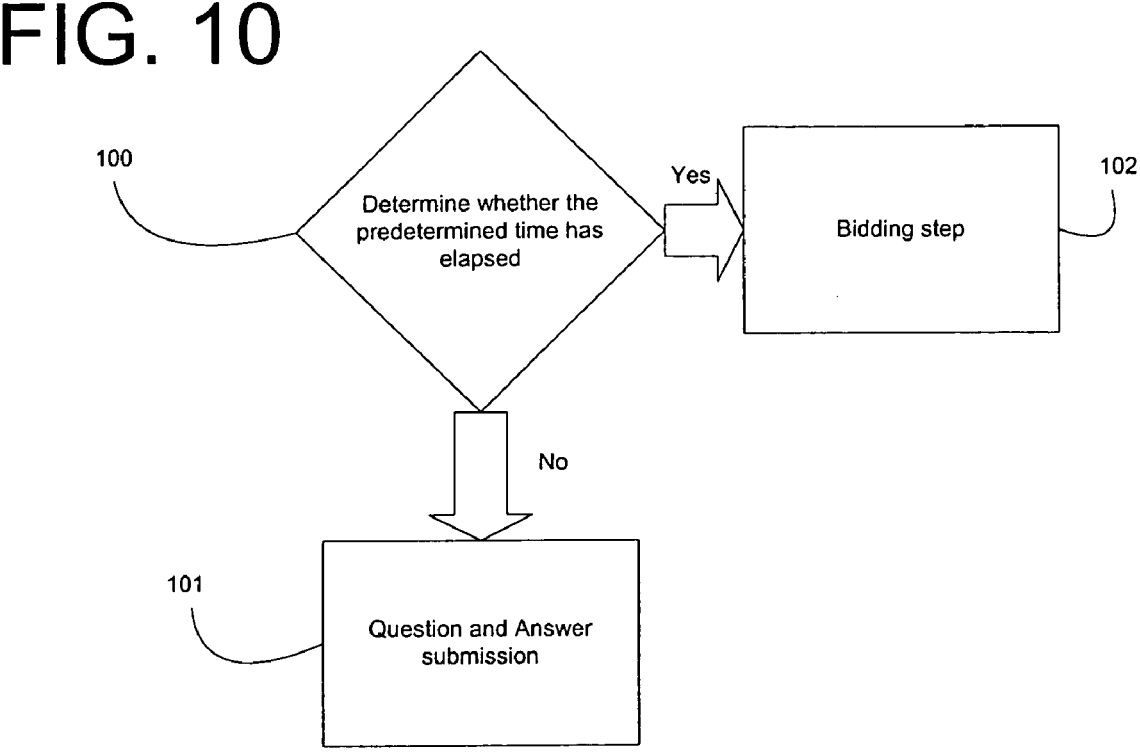
FIG. 10 is a flow chart of a review step of an auction step of FIG. 3.

Referring again to FIG. 8, once the auction is initiated, the auction is divided into two steps: (1) a review step 82 and (2) a bidding step 84. The auction begins with the review step 82. Referring to FIG. 10, a flow chart of review step 82 is shown. During review step 82, the applicant's Financing Request information, the summary of the underwriting information and some of the underwriting information are made available for the lenders to review on Web site 16 for a predetermined period of time, preferably two business days. However, this time frame may be altered, for instance for more complicated financing or if additional time is required to answer questions. The lenders can review such information, and may ask questions, preferably electronically via Web site 16 or via e-mail about the underwriting information and the applicant's Financing Request. Also, the lenders may formulate bids during this step. However, the submission of bids is not permitted during the review step.

The lenders preferably submit questions through the Web site 16 concerning the underwriting throughout review step 82. Responses to lenders' questions concerning the underwriting information may be provided by underwriting personnel familiar with the transaction. The questions and answers are preferably posted anonymously on a financing specific Web page within Web site 16 accessible to all lenders. The lenders may, via the same Web site 16, ask the applicant questions regarding their Financing Request and the applicant may, via the same Web site 16, ask the lenders questions about their bids at any time during the auction of applicant's financing. Advantageously, questions and answers are screened by the system representative to minimize disclosure of the identity of the bidders.

All questions concerning the underwriting information are preferably submitted prior to the final two days of a sealed bid period (discussed below) of the auction to allow enough time to answer relevant questions and give all lenders sufficient time to review the answers before the end of the sealed bid period. The sealed bid period may be extended if additional time is required to answer questions or for any other reason.

Referring again to FIG. 8, the next step is bidding step 84. During bidding step 84, lenders have the opportunity to submit bids via Web site 16 pertaining to applicant's Financing Request.

In a preferred embodiment, the lender submits a bid in the form of a multiple parameter bid form. Referring to FIGS. 13*a–g*, a representative sample bid submission form is shown in the form of sequentially captured and printed screen displays of an HTML bid document. The lender is requested to submit a bid and the bid form is preferably filled via Web site 16 through a question and answer format and/or via fill-in boxes and/or drop down menus.

First, a bid name used to identify the bid is included along with a bid submission date indicating the point in time the bid is to be submitted. The lender can select from among provided selections in a selection box (e.g. submit immediately, the next morning, at the start/end of bid periods) or the lender can enter a date. Similarly, the lender can select the bid expiration date to indicate the point in time following submission of the bid that the bid is to be automatically canceled. The lender can select from among provided selections in a selection box or drop down menu (e.g. submit immediately, the end of day, at the end of bid periods) or the lender can enter a date.

Also contained in the bid submission form is the lender commitment information such as the term of commitment which indicates the number of days after the acceptance of the commitment on which the commitment expires. The bid may also indicate that the lender is willing to waive any further review or approval rights with respect to one or more Third Party Reports.

Each bid form indicates the general interest rate characteristics, such as fixed rate for term, floating rate for term, or fixed rate converting to floating rate. The terms relating to the general interest characteristics are also included in the bid submission form, such as the length of time that the initial fixed rate is to be in effect or the pricing index which will determine the fixed or floating interest rate for the loan, and the fixed or floating rate spread. A minimum and/or maximum interest rate may be entered to indicate the lowest (the "floor") and/or highest (the "cap") possible rate for the fixed or floating interest rate. The maximum rate change indicating a maximum change (as a percentage) in the floating interest rate when the interest rate resets may also be provided.

The bid submission form may also indicate whether the lender requires the borrower to purchase an interest rate cap agreement and if so, the rate and term of the cap agreement is indicated. Under the terms of the interest rate cap agreement, a third party will be obligated to pay the excess of any interest to the extent the pricing index plus the floating spread exceeds the cap.

The bid form may also contain various other payment parameters, such as a lender provided early rate lock if the lender will give the borrower the option to lock the interest rate for the loan after commitment acceptance, the payment day of month, interest calculation basis (e.g., based on the number of days elapsed in a month assuming a year consisting of 365 days), grace period for monetary default, hyper amortization parameters (e.g., a right at the borrower's option to repay a loan without premium or penalty at an agreed upon date in the future with a provision that the interest rate will increase if the borrower elects not to repay the loan on the optional prepayment date).

Prepayment or defeasance terms may also be included in the lender bid submission which indicates whether the lender will permit the borrower to prepay or defease the loan prior to the end of the term including any yield maintenance, penalty schedule, and prepayment provisions. The bid form may also contain extension options if the borrower is permitted to extend the maturity date of the loan, loan structure provisions (i.e., whether loan is assumable, or the recourse type (e.g. recourse, non-recourse, or non-recourse with third party carve out and/or payment guarantor), environmental guarantor requirements, single purpose entity requirements (i.e., whether the sole business activity of the borrower will be the ownership and operation of the property or properties), non-consolidation requirements (i.e., in the event of a bankruptcy the assets and liabilities of the borrower would not be consolidated with the assets and liabilities of the equity members). The bid submission may also contain an independent director requirement if the borrower is to have an independent director, lockbox arrangements (e.g., hard, soft, springing or springing with a specific debt service coverage ratio) for the collection of rental payments and payment of debt service, taxes, insurance premiums and other items, management kick out provisions that allow the lender to terminate and replace the property manager, and earthquake insurance requirements. In addition, the bid submission form may include provisions indicating whether the borrower is allowed to incur additional debt and if so whether the amount of additional debt is limited, such as by a debt service coverage ratio test, a loan to value test or an additional debt dollar amount constraint and the type of security, if any, that the lender will permit the borrower to grant to secure the additional debt.

The bid submission form may also include provisions regarding the transfers of equity owners' interests (e.g., freely transferable, transferable with lender consent, up to 49% transferable) and up-front and ongoing reserves, such as escrow for tax and ground lease payments, insurance payments, cap expenditures, seasonal cash flow adjustments and rollover or monthly reserves for ongoing tenant improvements and leasing commissions. Fee information, such as commitment fees and origination fees may also be included in the bid submission form.

The bid form may also include loan sizing information such as the projected loan amount and any tests such as the maximum loan to value ratio test, the maximum loan to cost ratio test, the minimum debt service coverage ratio test and whether the lender's bid is based upon the underwritten net cash flow.

Although the above discussion is in terms of submission of bids by the lender, it should be noted that preferably the borrower identifies parameters desired for the loan as indicated in the bid form, such as loan amount, rate type, rate terms, etc., prior to the lenders' bid submission so that the desired parameters are indicated in the bid form as the lender fills out the bid submission form.

Preferably, bidding step 84 is divided into four periods: (1) a sealed bidding period; (2) a sealed bid evaluation period; (3) an open bidding period; and (4) a final evaluation period.

Figure 11:
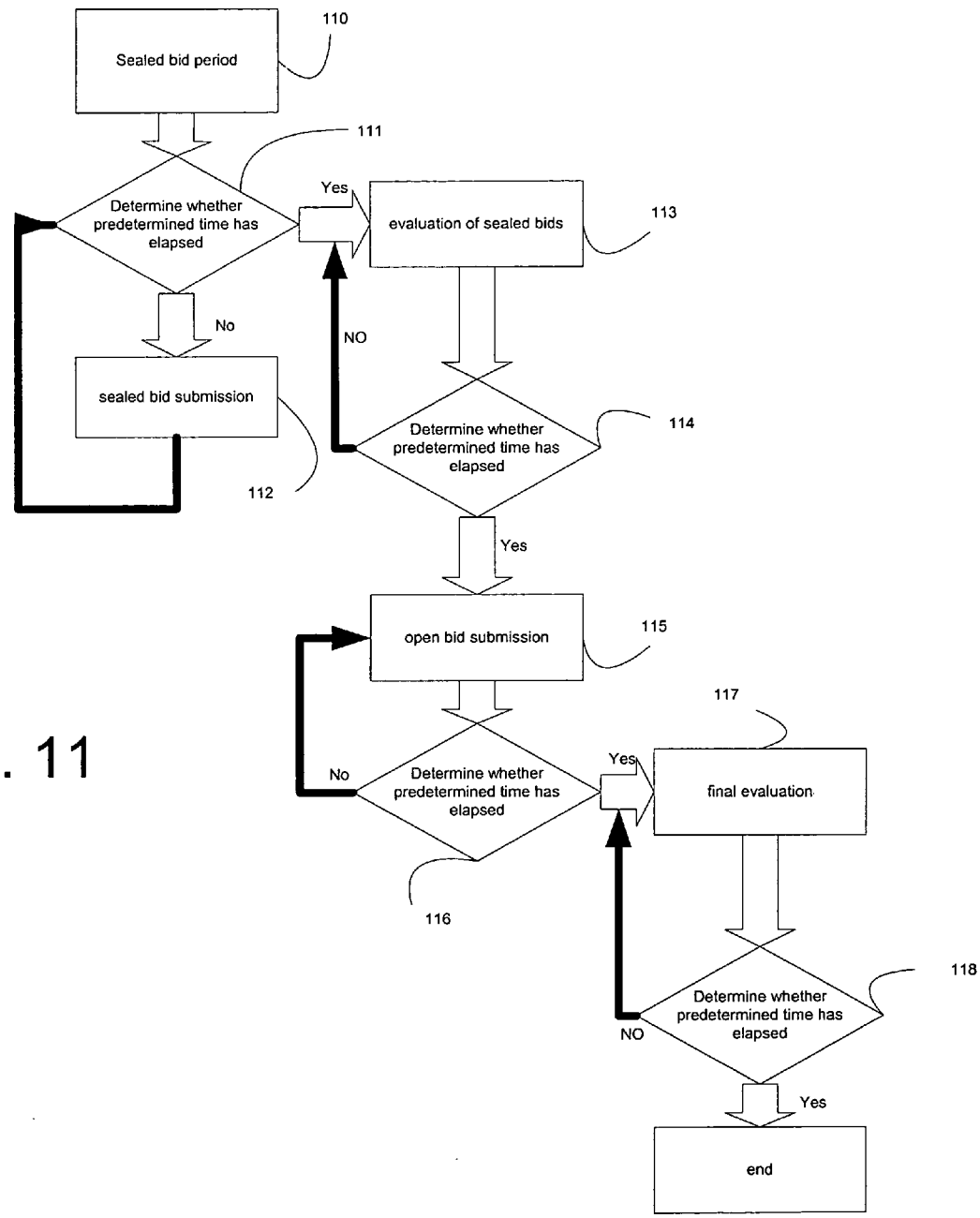
FIG. 11 is a flow chart of a bidding step of an auction step of FIG. 3.

As can be seen in FIG. 11, the sealed bid period commences at step 110. The sealed bid period lasts for a predetermined time, preferably two business days. Lenders may submit sealed bids at any time from the start until the end of this period at step 112; and the applicant may accept a bid at any time. Preferably, lenders may cancel bids throughout the sealed bid period. Preferably, only the applicant, the lender submitting the bid and underwriting personnel can review the terms of each submitted bid during this period.

If the applicant has not accepted a bid by the end of the sealed bidding period, an evaluation period is provided to the applicant at step 113 to review active bids. This period begins at the end of sealed bid period and lasts a predetermined time, such as one business day. During the entire sealed bid evaluation period, lenders may not submit or cancel bids; but, the applicant may accept a bid. Preferably, only the applicant and underwriting personnel can review the terms of the submitted bids during this period.

If the applicant has not accepted a bid by the end of the sealed bid evaluation period, an open bid period begins. This period lasts a predetermined time, preferably two business days. During the open bid period, lenders may anonymously submit bids at step 115. During this period, the applicant and all lenders can view the details of each active bid on Web site 16. Preferably, however, only the applicant can see the name of the lender that submitted the bid; and the lenders will view only a corresponding number for each bid instead of the lender's name. The lenders may submit and cancel bids and the applicant may accept a bid at any time during the open bid period.

If the applicant has not accepted a bid by the end of the open bidding period, an evaluation period is provided to the applicant at step 117 to review active bids. This period begins at the end of the open bidding period and lasts a predetermined time, such as one business day. During this period, lenders may not submit or cancel bids but the applicant may accept a bid at any time. Subject to the next paragraph, if the applicant does not accept a bid, the auction will be deemed to be a failed auction and a loan will not be originated.

In a preferred embodiment shown in FIG. 12, a certain group of lenders (designated as "Market Makers") may agree to be obligated to bid on borrowers' Financing Requests in a Market Maker bid period. In this embodiment, a Market Maker bidding period is provided if the applicant has not accepted a bid by the end of the open bid period and there have been less than a predetermined amount of bids (e.g. two) submitted from non-Market Makers during the auction that remained active for a minimum of 24 hours. The Market Maker bidding period preferably takes place following the open bid period, provided that there is at least one Market Maker obligated to bid on the subject financing. The Market Maker bidding period begins at the end of the open bidding period and will end after a predetermined time (e.g., at the close of the second trading day following the open bidding period). If the Market Maker bidding period is required, qualifying Market Makers are required to submit at least one commercially reasonable bid at step 120, which shall remain active for the remainder of the auction. During the Market Maker bidding period, a non-Market Maker lender with a bid still active at the end of the open bid period may submit new bids or may cancel any of its bids that were submitted prior to the beginning of the Market Maker bidding period 120. Similar to review step 82 shown in FIG. 10, the Market Makers can submit questions via the Web site 16 regarding the applicant's Financing Request during this period. Answers to such questions may be posted on a page at Web site 16 or via telephone.

Referring back to FIG. 8, at 86, auction step 34 ends when the applicant accepts a bid. Notice of bid acceptance is preferably posted on the Web site 16 so that lenders know not to continue submitting bids.

Referring back to FIG. 3, subsequent to the end of auction step 34, the closing step 36 begins. During this step a commitment letter is generated from the winning lender's bid by converting the terms of the winning bid into a commitment letter for the parties to execute and bind the parties into an agreement. Preferably, the borrower and lender have executed a binding agreement prior to the auction and each bid is legally binding so that once a bid is accepted, a binding commitment letter can be generated. The server automatically generates a commitment letter incorporating the bid parameters of the winning bid. Preferably, in accordance with the borrower agreement and the lender agreement, both the borrower and the winning lender execute the commitment letter within a predetermined time, such as within two business days of the acceptance of the bid or as set forth in the bid submission form. Also, preferably the applicant completes a title, survey and zoning order form as part of the commitment letter.

After the commitment letter has been generated and executed by the applicant and lender, the closing coordinator works with the applicant and winning lender to close the financing transaction according to the terms of the commitment letter and accepted bid. The underwriting information posted on the Web site 16 is reconfirmed and any additional underwriting required to close the loan is performed. Any remaining underwriting information is collected and net cash flow analysis is adjusted to reflect such underwriting information. A national statistical rating agency is preferably consulted to review the underwriting before the loan is originated. Finally, loan documents are prepared for the parties to sign to conclude the Financing Request and loan origination process.

Although the preferred embodiments of the invention have been described in the foregoing description, it will be understood that the present invention is not limited to the specific embodiments described above. For instance, the present invention may also be applicable in sale or purchase of other goods and services such as financial assets, real estate or an interest in real estate. Further, the invention may be practiced using different degrees of automation so that certain steps described above as being performed on the Web site or the server may also be performed manually within the spirit of the invention and likewise certain steps described as being performed by the system representative, the underwriter or the closing coordinator may be performed automatically by the server.

What is claimed is:

1. A method of facilitating a loan origination comprising:
   receiving from potential borrowers applications for loans to be secured by properties;
   creating a computer database for one or more potential loans, said database including underwriting information for said loans, said underwriting information not constituting a loan approval but including net cash flow information for the properties, property site inspection information and credit information pertaining to the borrowers;
   providing a plurality of prospective lending entities access via a communication network to at least part of the underwriting information in said computer database;
   receiving via a communication network bids from the plurality of prospective lending entities in an auction for said loans using the underwriting information they accessed;
   informing borrowers or their representatives of at least one of said bids for their loans; and
   closing a loan when one of said bids for that loan is accepted by one of the borrowers or their representatives.

2. The method of claim 1, further comprising:
   receiving a selection of one of a plurality of underwriting levels; and
   developing underwriting information corresponding to the selected level of underwriting.

3. The method of claim 2 wherein the plurality of underwriting levels includes at least first, second and third underwriting levels.

4. The method of claim 1 wherein the underwriting information comprises at least one of an appraisal report, an environmental report and an engineering report.

5. The method of claim 1 further comprising the step of providing representations and warranties that specific procedures were followed in developing the underwriting information.

6. The method of claim 1 further comprising the steps of: receiving information in support of the potential loan; and tracking the information that is received.

7. The method of claim 6 wherein the information received is tracked electronically.

8. The method of claim 1 further comprising the step of receiving a loan request that includes financing preferences and/or requirements specified by an applicant making the loan request.

9. The method of claim 1 further comprising:
   receiving from an applicant for the loan a designation of at least one lender whom the applicant does not want to be informed of applicant's request for the loan; and
   blocking said lender from access to information about applicant's request for the loan.

10. The method of claim 1 further comprising:
    receiving from an applicant for the loan a designation of at least one lender to be notified of applicant's request for the loan; and
    informing said lender of applicant's request for the loan.

11. The method of claim 1 further comprising receiving at least one inquiry relating to the loan request, the underwriting information, or a bid.

12. The method of claim 11 further comprising: storing the at least one inquiry; and
    providing access to the at least one inquiry to the prospective lenders.

13. The method of claim 12 further comprising the step of screening information in an inquiry.

14. The method of claim 12 further comprising the step of screening information in an inquiry to minimize disclosure of an identity of a prospective lender who made a bid.

15. The method of claim 11 further comprising the step of storing at least one response to an inquiry.

16. The method of claim 15 further comprising the step of screening information in a response.

17. The method of claim 15 further comprising the step of screening information in a response to minimize disclosure of an identity of a prospective lender who made a bid.

18. The method of claim 15 further comprising the step of providing prospective lenders access to the stored response.

19. The method of claim 15 further comprising the step of providing access to the stored response to an applicant for the loan.

20. The method of claim 1 wherein the opportunity to submit at least one bid is for a predetermined period of time.

21. The method of claim 1 wherein the auction comprises a review phase and a bidding phase and no bid is accepted during the review phase.

22. The method of claim 21 further comprising providing a plurality of bidding periods during the bidding phase.

23. The method of claim 1 wherein the opportunity to submit at least one bid comprises providing a bidding period during which all bids received from the prospective lenders are not accessible to other prospective lenders.

24. The method of claim 1 further comprising providing a bid evaluation period during which the ability to submit, modify, or cancel bids is limited.

25. The method of claim 1 wherein the opportunity to submit at least one bid comprises providing an open bidding period during which all bids received from prospective lenders are accessible to the prospective lenders.

26. The method of claim 25 wherein an identity of each prospective lender who made the bid is not accessible to the prospective lenders.

27. The method of claim 1 wherein the ability to submit, modify or cancel bids is limited.

28. The method of claim 1 further comprising providing at least one lender who is contractually obligated to make a bid if no more than a predetermined number of bids is available for consideration.

29. The method of claim 1 wherein the bid sets forth terms for a commitment to make the potential loan.

30. The method of claim 1 wherein the bid is a multi-parameter bid.

31. The method of claim 1 further comprising the step of developing additional underwriting information after acceptance of the bid.

32. The method of claim 31 wherein the document is automatically generated.

33. The method of claim 1 further comprising the step of providing a document for memorializing the bid in a commitment between a borrower and the prospective lender that made the bid.

34. The method of claim 33 wherein the document is automatically generated.

35. The method of claim 1 further facilitating closing the loan using documents based on the same underlying form regardless of which lender's bid is accepted.

36. The method of claim 1 further comprising the step of receiving an underwriting review from at least one national statistical rating agency.

37. The method of claim 36 further comprising the step of providing at least one prospective lender access to at least part of the received underwriting information.

38. A software program embodied in a computer-readable medium for processing financing requests, the software program configuring a computer to:
   receive from potential borrowers applications for loans to be secured by properties;
   receive underwriting information relating to potential loans;
   create a computer database for one or more potential loans, said database including underwriting information for said loans, said underwriting information not constituting a loan approval but including net cash flow information for the properties, property site inspection information and credit information pertaining to the borrowers;
   provide a plurality of prospective lending entities access via a communication network to at least part of the underwriting information in said computer database;
   receive via the communication network bids from the plurality of prospective lending entities in an auction for said loans using the underwriting information they accessed;
   inform borrowers or their representatives of at least one of said bids for their loans; and
   close a loan when one of said bids for that loan is accepted by one of the borrowers or their representatives.

39. The software program of claim 38 configuring the server computer to:
   receive a selection of one of a plurality of underwriting levels; and
   receive underwriting information corresponding to the selected level of underwriting.

40. The software program of claim 39 wherein the plurality of underwriting levels includes at least first, second and third underwriting levels.

41. The software program of claim 38 wherein the underwriting information comprises at least one of an appraisal report, an environmental report and an engineering report.

42. The software program of claim 38 configuring the server computer to:
   receive information in support of the potential loan; and
   track the information that is received.

43. The software program of claim 42 wherein the information received is tracked on-line.

44. The software program of claim 38 configuring the server computer to receive a loan request that includes financing preferences and/or requirements specified by an applicant making the loan request.

45. The software program of claim 38 configuring the server computer to:
   receive from an applicant for the loan a designation of at least one lender whom the applicant does not want to be informed of applicant's request for the loan; and block said lender from access to information about applicant's request for the loan.

46. The software program of claim 38 configuring the server computer to:
   receive from an applicant for the loan a designation of at least one lender to be notified of applicant's request for the loan; and
   inform said lender of applicant's request for the loan.

47. The software program of claim 38 configuring the server computer to receive at least one inquiry relating to the underwriting information.

48. The software program of claim 47 configuring the server computer to:
   store the at least one inquiry; and
   provide access to the at least one inquiry to the prospective lenders.

49. The software program of claim 47 configuring the server computer to screen information in an inquiry.

50. The software program of claim 47 configuring the server computer to screen information in an inquiry to minimize disclosure of an identity of a prospective lender who made a bid.

51. The software program of claim 47 configuring the server computer to store at least one response to an inquiry.

52. The software program of claim 51 configuring the server computer to screen information in a response.

53. The software program of claim 51 configuring the server computer to screen information in a response to minimize disclosure of an identity of a prospective lender who made a bid.

54. The software program of claim 51 configuring the server computer to provide prospective lenders access to the stored response.

55. The software program of claim 51 configuring the server computer to provide access to the stored response to an applicant for the loan.

56. The software program of claim 38 wherein the bid may be considered for a predetermined period of time.

57. The software program of claim 38 wherein the auction comprises a review phrase and a bidding phase and no bid is accepted during the review phase.

58. The software program of claim 57 wherein the underwriting information is configured to provide a plurality of bidding periods during the bidding phase.

59. The software program of claim 38 configuring the server computer to provide a bidding period during which all bids received from the prospective lenders are not accessible to other prospective lenders.

60. The software program of claim 38 configuring the server computer to provide a bid evaluation period during which the ability to submit, modify, or cancel bids is limited.

61. The software program of claim 38 configuring the server computer to provide an open bidding period during which all bids received from prospective lenders are accessible to the prospective lenders.

62. The software program of claim 38 wherein an identity of each prospective lender who made the bid is not accessible to the prospective lenders.

63. The software program of claim 38 wherein the ability to submit, modify or cancel bids is limited.

64. The software program of claim 38 wherein the bid sets forth terms for the potential loan.

65. The software program of claim 38 wherein the bid is a multi-parameter bid.

66. The software program of claim 38 configuring the server computer to develop additional underwriting information after acceptance of the bid.

67. The software program of claim 38 configuring the server computer to provide a document for memorializing the bid in a commitment between a borrower and the prospective lender that made the bid.

68. The software program of claim 67 wherein the document is automatically generated.

69. The software program of claim 38 configuring the server computer to close the loan using documents having the same form regardless of which lender's bid is accepted.

70. The software program of claim 38 configuring the server computer to receive underwriting information from at least one national statistical rating agency.

71. The software program of claim 70 configuring the server computer to provide at least one prospective lender access to at least part of the received underwriting information.

* * * * *